United States Patent [19]
Kallet

[11] 3,719,410
[45] March 6, 1973

[54] MIXING AND MEASURING APPARATUS

[75] Inventor: Eli A. Kallet, Teaneck, N.J.

[73] Assignee: Farrand Optical Co., Inc., Valhalla, N.Y.

[22] Filed: Nov. 10, 1971

[21] Appl. No.: 197,501

[52] U.S. Cl. .................. 356/36, 23/259, 23/292, 250/71 R, 356/246
[51] Int. Cl. .................. G01n 21/52, G01n 1/00
[58] Field of Search ....... 356/244, 246, 36; 250/71 R; 23/259, 292

[56] References Cited

UNITED STATES PATENTS

| | | | |
|---|---|---|---|
| 3,585,007 | 6/1971 | Gross | 23/292 X |
| 3,193,357 | 7/1965 | Benzinger | 23/259 X |
| 3,679,312 | 7/1972 | Mansberg | 250/71 R |
| 2,971,429 | 2/1961 | Howerton | 250/71 R |
| 1,660,974 | 2/1928 | Porro | 23/259 |
| 2,587,221 | 2/1952 | Richardson et al. | 23/292 X |
| 2,643,940 | 6/1953 | Stevens | 23/259 |
| 3,586,064 | 6/1971 | Brown et al. | 23/259 X |

*Primary Examiner*—Ronald L. Wibert
*Assistant Examiner*—F. L. Evans
*Attorney*—William E. Beatty

[57] ABSTRACT

Disclosed is a mixing device and measurement apparatus suitable for use in the kinetic photometric analysis of enzymes and other substances. The mixing apparatus includes a test cell having a base container for holding one reactant solution and having a mixing container for holding another reactant. To mix the reactants and initiate the reaction, the mixing container is forced into the base container whereby the solution is transferred between containers.

8 Claims, 6 Drawing Figures

PATENTED MAR 6 1973

INVENTOR.
ELI A. KALLET

BY David E. Lovejoy
ATTORNEY

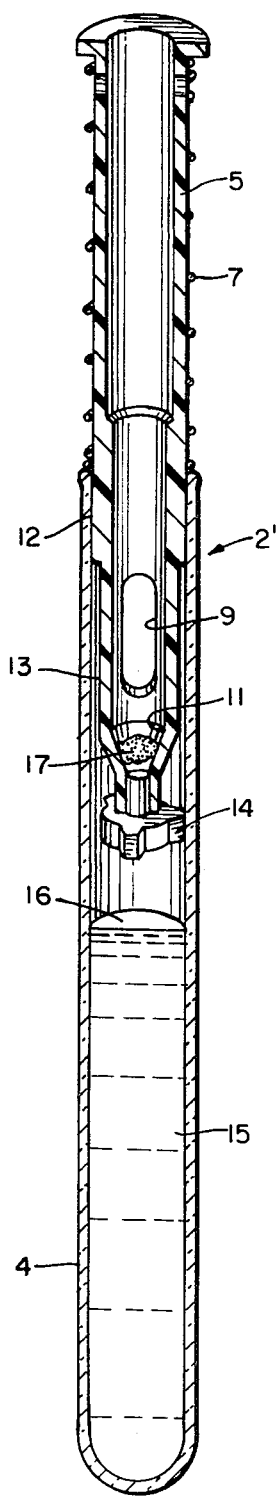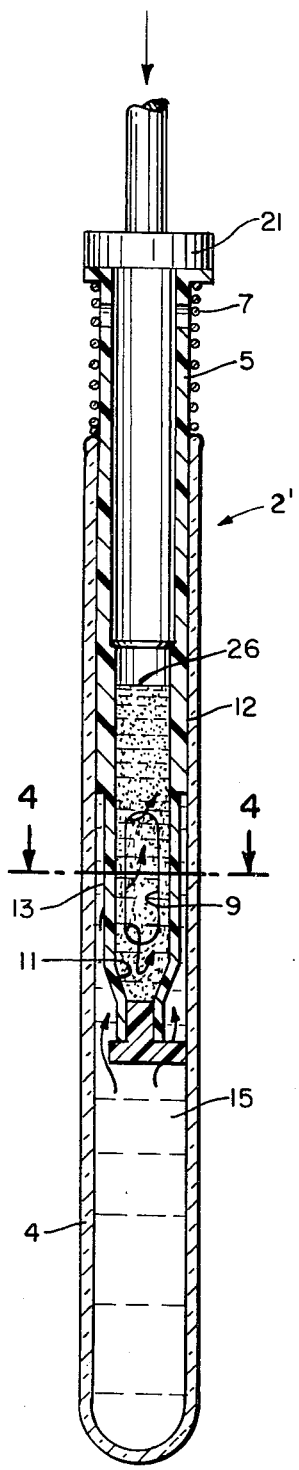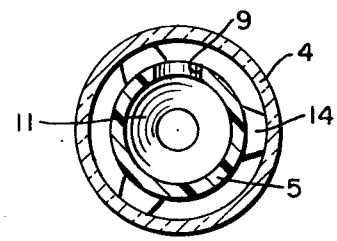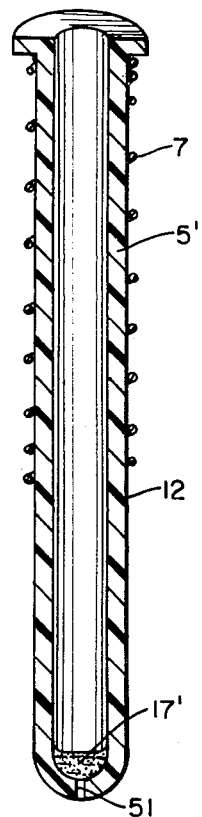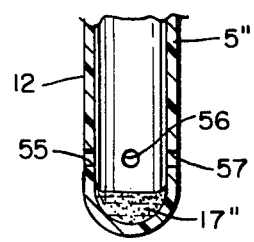

MIXING AND MEASURING APPARATUS

BACKGROUND OF THE INVENTION

The measurement of enzymes, and other substances, is typically carried out by measuring their rate of reaction under controlled conditions. Frequently, the initial rate of reaction is of interest because, for some reactions, the rate of the reaction changes soon after the start of the reaction. It is desirable, therefore, to test some reactions at least within a few seconds after the start of the reaction.

One method of measuring an enzyme reaction is to mix one reactant with another reactant and thereafter measure the fluorescense or absorption changes which occur. To obtain full information about the reaction, a continuous monitoring with a fluorescense or absorption photometer is useful.

Because of the desirability of obtaining fluorescence or absorption measurements during the initial reaction period, the problem arises as to how to rapidly and thoroughly mix the reactants at the same time the measurement is commenced and without contaminating the reactants.

In accordance with the above background of the invention, it is an object of the present invention to provide an apparatus for mixing reactants which allows measurements to occur substantially simultaneously with the start of the reaction.

SUMMARY OF THE INVENTION

The present invention is a measuring and mixing apparatus suitable for use in measuring the reaction changes of enzymes carried out with a photometric measuring device. The measuring and mixing apparatus includes a first transparent container for holding a first reactant in solution and a second container which fits within the first container for holding a second reactant. The second container includes an opening in its wall.

To mix the reactants and initiate the reaction, the second container is inserted into the first container forcing the solution and first reactant through the opening into the second container. The turbulence of the solution entering the second container causes a thorough mix to occur. Upon the retraction of the second container from the first container, the solution of mixed reactants is forced through the opening back into the first container thereby completing the mixing operation.

The thoroughness of the mix results from the turbulence of the first reactant solution passing through the opening into the second container both during the insertion and retraction strokes of the second container. The second container closely fits within and forms a seal with the first container above the opening so that the solution flow between containers is aided by atmospheric pressure as well as gravity. Because each cell includes both first and second containers, each cell is an entity by itself which is readily maintained free of contamination.

BRIEF DESCRIPTION OF THE DRAWINGS

FIG. 2 depicts a section view of one of the test cells of FIG. 1 wherein the mixing container is retracted from the base container of the cell.

FIG. 3 depicts the test cell of FIG. 2 wherein the mixing container is inserted into the base container.

FIG. 4 depicts a cross-sectional view of the FIG. 3 test cell.

FIG. 5 depicts an alternate mixing container for use with the base containers in the test cells of FIGS. 2 and 3.

FIG. 6 depicts a further alternate end portion for a mixing container.

DETAILED DESCRIPTION

Figure 1:
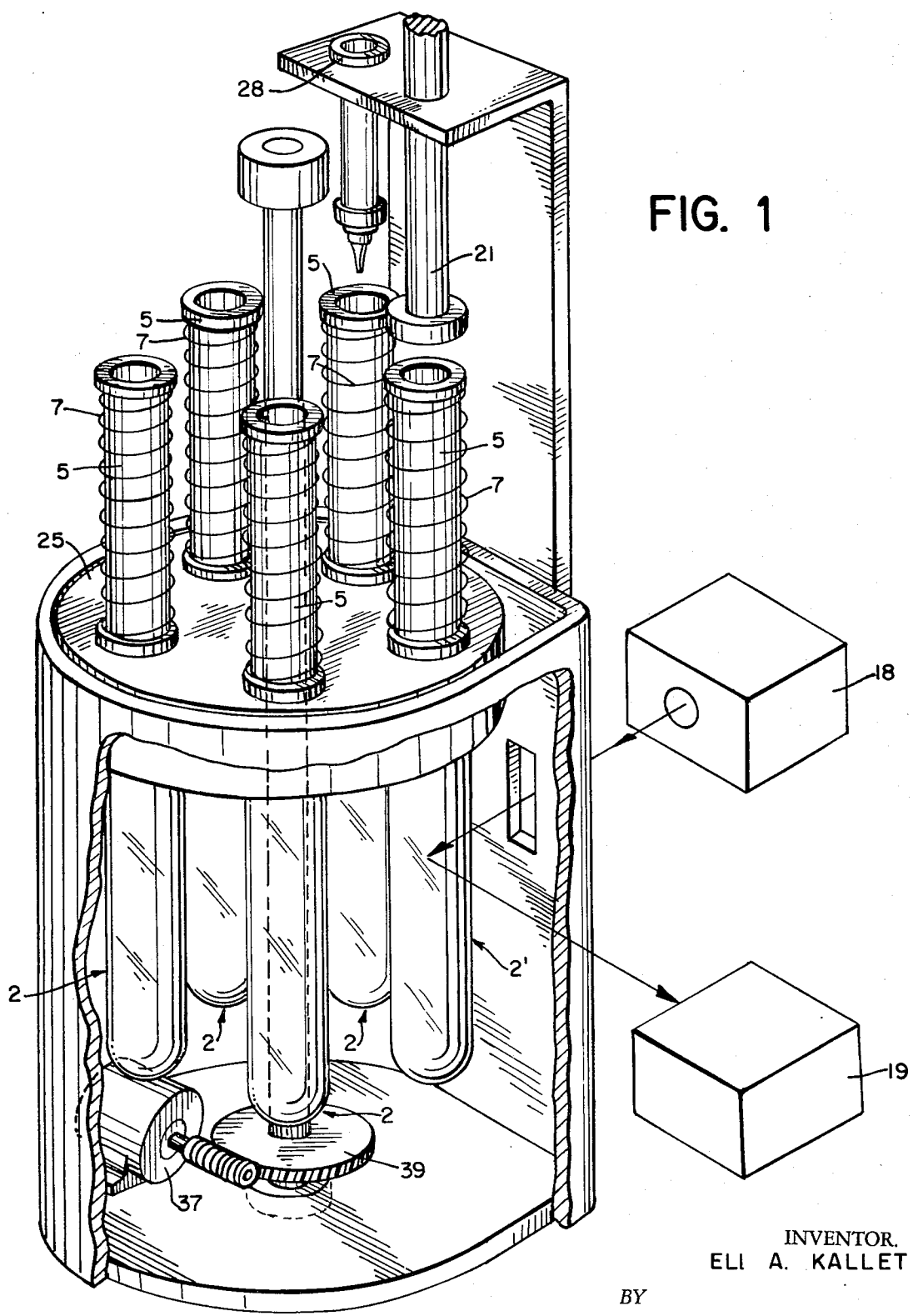
FIG. 1 depicts a perspective view of the mixing and measuring apparatus including a plurality of test cells in a turret assembly positioned in the optical path of a radiation source and a radiation receiver.

Referring to FIG. 1, a plurality of test cells 2 are shown in a turret assembly 25. Each of the test cells, for example, typical test cell 2', includes a base container 4 and a mixing container 5. The mixing container 5 is adapted to be injected into the base container 4 typically by the operation of a plunger 21. Compression spring 7, between the base container 4 and the lip on the mixing container 5, is operative to maintain the mixing container 5 retracted from the base container 4.

Cell 2' is located in the optical path of the radiation source 18. Radiation from source 18 causes the reactants in base container 4 to fluoresce. That fluorescence is detected by radiation detector 19 to form a measurement of the reaction occurring in the base container 4.

The radiation source 18 and the radiation receiver 19 of FIG. 1 are any conventional devices for supplying and analyzing selected frequencies. Typically, the monochromators of the Czerny-Turner type as marketed, for example, by the Farrand Optical Co., Inc. in the MK-1 Automatic Scanning Spectrofluorometer are suitable for use in the present invention. Alternatively, light sources and filters may be employed. Both fluorescence and absorption devices and techniques may be employed.

Still referring to FIG. 1, the test cell 2' is shown in the test station. Turret 25 typically rotates to position any of the test cells 2 into the location of cell 2' where the fluorescent measurement is made. A motor 37, gear assembly 39 and other conventional apparatus are typically employed for indexing the turret 25 automatically. Turret 25 may also be manually indexed. A pipette 28 or other means are conveniently employed for injecting an enzyme into the mixing container. When the test cell is indexed to the location of cell 2', plunger 21 forces the mixing container 5, against the force of compression spring 7, into the base container 4.

Referring to FIG. 2, the test cell 2' is shown in section taken along the lines 2—2 of FIG. 1. The base container 4 of test cell 2' contains a first reactant in a solution 15 which fills base container 4 up to the level 16. The mixing container 5 of cell 2' contains a second reactant 17. The second reactant 17 lies in the bottom 11 of mixing container 5 below level of the opening 9. Opening 9, in the FIG. 2 embodiment, appears in the side wall of container 5.

The mixing container 5 has an outside wall diameter in its central region 12 which closely fits within the inside wall of the base container 4. In this manner, a seal is formed between the inner wall of base container 4 and the outer wall of mixing container 5 in the central region 12.

The base container 4 in FIGS. 2 and 3 are typically constructed of glass, quartz, or other transparent material. The base containers 4 are the usual test tubes or test cells found in chemical laboratories. The base container 4 is typically a glass tube having the approximate dimensions of 75 mm. in height, 8 mm. in inside diameter and 10 mm. in outside diameter. The mixing container 5 typically has approximate dimensions of 67 mm. in height, 7.9 mm. in outside diameter around the upper portion and 6.8 mm. in outside diameter around the lower portion. An opening of approximately 13 mm. high by 3 mm. wide is located in the lower portion of the container 5. Test cells having the above approximate dimensions have been successfully tested for measuring reactions within 1½ seconds, as measured from the time the mixing container commences its initial travel into the base container.

The mix container 5 is typically formed of a synthetic resin polymer such as that commonly marketed under the trade mark Teflon. The mixing container 5 includes a three-pronged foot 14 which serves to guide the container 5 along a path parallel to the walls of the base container 4. The foot 14 by assuring parallelness, facilitates depositing the reactant 17 in the center bottom of the container 5.

The mixing container 5 is normally held in the retracted position by the compression spring 7. Compression spring 7 is located around the outer wall of container 5 resting on the top lip of container 4 and under the top lip of the container 5. In the vicinity of the opening 9, the outside wall diameter of container 5 is smaller than that wall diameter above the opening 9. This smaller outside diameter provides clearance for the solution 15 to pass up and around the mixing member 5 when the mixing member is injected into the base member, allowing solution 15 to turbulently pour through the opening 9 into the inside of mixing container 5.

Referring to FIG. 3, the mixing container 5 is shown injected into the base member 4, a condition which occurs by the operation of plunger 21. During the injection of container 5 into container 4, the solution 15 passes through the opening 9, mixes with the reactant 17 and rises to the level 26. Because of the seal formed between containers in the area 12, the solution is forced through opening 9.

When the plunger 21 in FIG. 3 is again removed (not shown), the action of compression spring 7 forces the mixing container 5 to be withdrawn from the base container 4 so that both gravity and atmospheric pressure on surface 26 cause solution 15 to be turbulently expelled back through the opening 9 so that the solution level in base container 4 is again substantially the same as that shown at level 16 in FIG. 2. The solution returned to container 4 contains the reactants thoroughly mixed. Because each cell includes its own mixing container, rather than a common mixer used by all base containers, no transfer or contamination from cell to cell can occur.

Referring to FIG. 5, a mixing container 5' is an alternative design which can be substituted for the mixing container 5 of FIG. 2. The container 5 includes a uniform wall thickness which when placed in a base container 4 also forms a partial seal with the inner walls of the base container 4. The mixing container 5' includes a hole 51 which has a diameter which prevents the reactant solution 17' from spilling through hole 51 due to the surface tension of solution 17'. A hole of approximately 0.005 inch has been found satisfactory when the solution 17' is milk. When the member 5' is inserted into the base container 4 of FIG. 3, the solution is forced through the hole 51 and overcomes the surface tension forces. The presence of the seal between the mixing container 5' outer wall and the base member 4 inner wall in the region around the area 12 aids the overcoming of the surface tension forces. The solution 15 after entering the mixing member 5' through hole 51 mixes with the reactant solution 17'. When the mixing member 5' is thereafter withdrawn from container 4, atmospheric pressure again forces the solution through the hole 51 back into the base container 4 allowing the fluorescence measurement to be made in the manner previously described in connection with FIG. 1.

Referring to FIG. 6, a lower end portion of a mixing container 5'' is shown as an alternate embodiment for the FIG. 5 mixing container. The end portion 5'' differs from the end portion of mixing container 5' in that the holes 55, 56 and 57 are in the side walls of container 5'' whereas in FIG. 5, the hole 51 is in the bottom. In FIG. 6, the side wall holes allow the reactant 17'' to be placed in the bottom without reliance upon the surface tension to prevent spilling into the base container.

While the test cells have been described so that the mixing containers 5, 5' and 5'' form a seal with the base containers 4, this feature is not required for all embodiments of the present invention. For example, the test cell of FIG. 5 operates satisfactorily for some solutions and reactants relying only upon the forces of gravity.

Although the test cells have been shown in the various embodiments as tubular in construction, rectangular containers and other geometric forms are within the scope of the present invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An apparatus for measuring a reaction resulting from the mixing of first and second reactants, the improvement comprising, a first container for holding said first reactant in solution, a second container for holding said second reactant, said second container slidably insertable into said first container and having an opening whereby the insertion and withdrawal of said second container into and from said first container causes said solution to flow turbulently through said opening and mix said reactants and wherein said first container is a transparent tube and wherein said second container is a synthetic resin polymer tube having said opening in a side wall; said polymer tube having a first outer wall diameter, in the area above said opening, which causes said outer wall to slidably engage the inner wall of said first container thereby forming a seal; said polymer tube having, in the area below said opening, a second outer wall diameter less than said first outer wall diameter so as to facilitate passage of said solution through said opening.

2. The apparatus of claim 1 wherein said second container includes a three-pronged foot for guiding and maintaining said second container parallel to said inner walls of said first container.

3. The apparatus of claim 1 wherein said opening is approximately 13 mm. in the lengthwise direction and 3 mm. in the crosswise direction of said second container; wherein said second container has an outside diameter of approximately 8 mm.; and wherein the inside diameter of said first container is approximately 8 mm.

4. The apparatus of claim 1 further including a compression spring for retracting said second container from said first container.

5. An apparatus for measuring a reaction resulting from the mixing of first and second reactants, the improvement comprising, a first container for holding said first reactant in solution, a second container for holding said second reactant, said second container slidably insertable into said first container and having an opening whereby the insertion and withdrawal of said second container into and from said first container causes said solution to flow turbulently through said opening and mix said reactants and wherein said first container is a transparent tube and wherein said second container is a synthetic resin polymer tube having said opening in the bottom wall, said polymer tube having an outer side wall diameter which slidably engages the inner wall of the transparent tube thereby forming a seal, said opening in the bottom wall of said polymer tube having a diameter which prevents the solution in said second container by action of surface tension from passing through said opening until said second container is inserted down into the reactant solution in said first container.

6. The apparatus of claim 5 where said opening is approximately 0.13 mm. in diameter.

7. An apparatus for measuring the radiation of a reaction resulting from the mixing of first and second reactant solutions, the improvement comprising, a photometric apparatus including a source for radiating a test cell station with a selected waveband and an analyzer for measuring the resultant radiation from said test cell station;

a test cell for placement in said test cell station for containing said first and second reactants, said test cell including, a base container for holding said first reactant solution, a mixing container for holding said second reactant solution, said mixing container slidably inserted into said base container, said mixing container being a synthetic resin polymer tube which forms a seal with said base container, said polymer tube having a bottom and a side wall opening above said bottom, means for injecting said mixing container into said base container whereby said first reactant solution turbulently flows through said opening and mixes with said second reactant solution, means for withdrawing said mixing container from said base container whereby the mixed first and second reactant solutions turbulently flow through said opening into said base container for radiation measurement.

8. The apparatus of claim 7 wherein said source and said analyzer are monochrometers and wherein said resultant radiation is the luminescence of an enzyme reaction.

* * * * *